US006620769B1

(12) United States Patent
Juppe et al.

(10) Patent No.: US 6,620,769 B1
(45) Date of Patent: Sep. 16, 2003

(54) ENVIRONMENTALLY ACCEPTABLE FLUID POLYMER SUSPENSION FOR OIL FIELD SERVICES

(75) Inventors: Herbert L. Juppe, Houston, TX (US); Robert P. Marchant, Kenedy, TX (US); Mohand Melbouci, Wilmington, DE (US)

(73) Assignee: Hercules Incorporated, Wilmington, DE (US)

( * ) Notice: Subject to any disclaimer, the term of this patent is extended or adjusted under 35 U.S.C. 154(b) by 178 days.

(21) Appl. No.: 09/717,884

(22) Filed: Nov. 21, 2000

(51) Int. Cl.$^7$ ................................................ C09K 7/06
(52) U.S. Cl. .................... 507/103; 507/203; 507/110; 507/111; 507/112; 507/113; 507/114; 507/115; 507/119; 507/120; 507/138; 507/209; 507/211; 507/212; 507/213; 507/214; 507/215; 507/216; 507/217; 507/224; 507/225; 507/261; 507/265; 507/136; 507/905
(58) Field of Search ................ 507/103, 203, 507/110, 111, 112, 113, 114, 115, 119, 120, 138, 209, 211, 212, 213, 214, 215, 216, 217, 224, 225, 261, 265, 136, 905

(56) References Cited

U.S. PATENT DOCUMENTS

| | | | |
|---|---|---|---|
| 4,566,977 A | 1/1986 | Hatfield | 252/8.5 |
| 4,990,608 A | 2/1991 | Zapico | 536/84 |
| 5,001,231 A | 3/1991 | Zapico | 536/84 |
| 5,151,131 A | 9/1992 | Burkhalter et al. | 106/822 |
| 5,333,698 A | 8/1994 | Van Slyke | 175/65 |
| 5,607,901 A * | 3/1997 | Toups, Jr. et al. | 507/103 |
| 5,837,655 A * | 11/1998 | Halliday et al. | 507/103 |
| 5,846,913 A * | 12/1998 | Sawdon | 507/103 |
| 6,410,488 B1 * | 6/2002 | Fefer et al. | 507/103 |

FOREIGN PATENT DOCUMENTS

GB 2 297 103 A 7/1996 ............ C09K/7/06

OTHER PUBLICATIONS

Clark, Abstract of SPE Petroleum Engineering "Vision 2020" Symposium (Tulsa 8/29–31/94), Proceedings 215–27, 1994.*
Boyd, P. A. et al, "New Base Oil Used in Low–Toxicity Oil Muds", Journal of Petroleum Technology, Aime, Dallas, TX, 1985, pp. 137–142.
Blackman, R. A.A. et al., "The effects of new oil–based drill–muds in sediments on an improved tank test"; Oil Chem. Pollution, 1989, 5 (5), pp. 365–378—Abstract.

* cited by examiner

*Primary Examiner*—Philip Tucker
(74) *Attorney, Agent, or Firm*—David Edwards

(57) ABSTRACT

This invention provides a water-free oil based fluid polymer suspension composition for use as a rheology modifier and fluid loss reducer in oil or gas well servicing fluids. It has been found that by using white medicinal oil as a carrier, high solids content and environmental friendly anhydrous fluidized polymer suspensions of xanthan gum, cellulose ethers, guar gum and derivatives thereof can be prepared. More specifically, in one aspect, an oil-based fluid polymer suspension (FPS) composition for use in oil or gas well servicing fluids is preferred containing:

a) a hydrophilic polymer,
 b) an organophilic clay,
 c) a stabilizer, and
 d) a white medicinal oil having selected properties.

54 Claims, 1 Drawing Sheet

Graph 1: Hydration rate of 40 pptg Example 21 in 2% KCl (77°F, 511 Sec -1)

FIG. 1

Graph 1: Hydration rate of 40 pptg Example 21 in 2% KCl (77°F, 511 Sec -1)

FIG. 2

Graph 2: Crosslinked gel viscosity development @ 200 °F

ENVIRONMENTALLY ACCEPTABLE FLUID POLYMER SUSPENSION FOR OIL FIELD SERVICES

FIELD OF THE INVENTION

This invention relates to a non-aqueous fluid polymer suspension for use as a rheology modifier and fluid loss reducer in oil field applications. More particularly, this invention is directed to the use of an environmentally acceptable fluidized polymer suspension of cellulosic ethers and guar and its derivatives for use in oil field applications such as completion fluids, drilling fluids, fracturing fluids, stimulation fluids and oil well cement slurries.

BACKGROUND OF THE INVENTION

Prior to the present invention, offshore drilling operations have caused much pollution of our oceans and waterways to the point that many countries, especially the Scandinavian countries, have started to impose environmental restrictions for operations in these oceans and waterways. The pollution has severely endangered the fish and plant life in these bodies of water and threatens the balance of the ecology systems of these waters. In the past few years, severe environmental restrictions in the oil well drilling activities, especially in North Sea sector, have been made in the direction of requiring more environmentally friendly drilling fluid systems. In this category, water based fluid systems are most preferred assuming all chemicals contained in the fluid systems exhibit low toxicity and high biodegradability. The chemicals used in these fluid systems are regarded as separate components that should meet the environmental regulations for nonpolluting drilling fluids.

Drilling fluids can be classified on the basis of their principle component, which is water, oil, pseudo-oil, or gas. Within each broad classification are divisions based on composition or chemistry of the fluid or the dispersed phase. Frequently, two—and sometimes all four—of these fluids are present in a drilling operation at the same time. Water-based drilling fluids make up about 90% of all drilling fluids and can be environmentally friendly.

Water-based drilling fluids have water as a continuous phase and are regarded as environmental friendly. The make up water may contain several dissolved substances, generally including alkalies, salts, organic polymers and various insoluble mineral substances in suspension. Depending upon the quality of the make up water, composition and the desired properties of the drilling fluid, organic polymers may be selected from polyanionic cellulose (PAC) and carboxymethylcellulose (CMC) to thicken and control the fluid loss of water-based drilling fluids. They are the most widely used cellulose ethers in drilling fluids. For technical and economical reasons, they are often used in combination with xanthan gum and starch or its derivatives.

Oil-based drilling fluids have diesel and occasionally crude oil as a continuous phase with both internal water and solid phases. Fluids with less than 5–10 volume % of water are called oil-based muds whereas those with higher water contents are called invert oil-emulsion muds, or simply inverts. These oil-based drilling fluids cause the most pollution because of the nature of their components being nonbiodegradable and toxic and containing aromatic hydrocarbons.

However, in the North Sea sector, the potential for continued use of oil based drilling fluids is restricted because of the new regulatory requirements regarding the discharge of such drilling fluids as well as the contaminated drilled cuttings.

Until 1992, two separate conventions (Oslo, Norway in 1974 & Paris, France in 1978) were established to regulate and protect Marine environment. They were administered respectively by Oslo and Paris commissions. Initially, the Oslo commission's task was to "Regulate and Control the Dumping at Sea of Industrial Wastes, Sewage Sludge and Dredged Material and the Incineration at Sea of Liquid Industrial Wastes". The dumping of industrial wastes and sewage sludge and incineration at sea have now been phased out. Next to Oslo convention, it was felt necessary at this time to draw up a similar document, dealing not with the prevention of marine pollution by dumping, but instead with the prevention of marine pollution by discharges of dangerous substances from land-based sources, water sources or pipelines. Negotiations on this topic resulted in the completion of the Paris convention for "the prevention of Marine Pollution from Land-Based Sources". The Paris commission was involved in a thorough review of the use and manufacture of various substances in order to establish the best environmental practice or best available techniques to prevent pollution.

In 1992, a new Convention for the Protection of the Marine Environment of the North-East Atlantic (the "OSPAR" Convention) was adopted together with a final action plan to guide the future work of the commissions. The OSPAR convention did enter into force in early 1998. The OSPAR commission has the status of an international organization in the terms of British legislation. In 1995 the OSPAR commission introduced the Harmonized Offshore Chemical Notification Format ("HOCNF") to create a mandatory control system for the use and discharge of offshore chemicals. Suppliers of chemicals that are used offshore were now obligated to perform several ecotoxicity tests so that the effect of the chemicals could be assessed. Chemicals are classified into 6 different hazardous group categories (A–E, Z) with group "E" being the least hazardous (like CMC, HEC, Guar). Group "A" being the most hazardous chemical that should be only used when it can be demonstrated that such usage presents an acceptable risk to the marine environment. Group "Z" chemicals (such as standard commercially available mineral oils used for oil based muds (OBMs)) must only be used in "Zero" discharge applications.

In offshore drilling wells, the carrying capacity of the drilling fluid must be high enough to remove drilling cuttings and other formation material that may fall into the well bore and low enough to prevent overloading site pumping equipment that may result in risk of fracturing the formation. These drilled solids are carried up through the annulus to the surface where they are separated and disposed. In addition, for maximum drilling rate, a low effective viscosity is desired at shear rates generated through the bit nozzles in the range of 10,000–100,000 $\sec^{-1}$. Drilling fluids are normally shear thinning, with apparent viscosity decreasing with increasing shear rate.

Hydrophilic polymers are commonly used in oil field servicing applications which most of them are brought to the site as dry particulate solids. If such hydrophilic polymers were mixed directly with other servicing ingredients and water, in certain instances these ingredients would tend to agglomerate and would be difficult to use. In order to obviate such problem, fluid polymer suspensions were developed and are currently being used to deliver the hydrophilic polymers to the work sites.

Examples of such fluid polymer suspensions for use in oil field servicing applications that are oil-based are U.S. Pat. Nos. 5,001,231, 5,151,131, and 4,566,977. These patents disclose fluid polymer suspension compositions that include diesel, mineral or paraffin oil, a surfactant, water, organophilic clay, and a cellulose ether or guar for oil field servicing applications.

The most used solvents cited in the prior art include mineral oil, kerosene, diesel fuel, glycols and tall oil fatty acid (TOFA). With the exception of glycol and TOFA, the hydrocarbon-based solvents that are commercially available and are also used in oil-based drilling fluids are no longer acceptable for certain areas. Although these systems in the past solved the mixing and mobility problem of the hydrophilic polymers, they do not meet the new environmental regulations, particularly in the North Sea sector. Hence, there still is a need for environmentally acceptable fluid polymer suspensions to meet the new environmental standard requirements.

SUMMARY OF THE INVENTION

The present invention is directed to a water free oil based fluid polymer suspension composition for use as a rheology modifier and fluid loss reducer in oil or gas well servicing fluids comprising a hydrophilic polymer, an organophilic clay, a stabilizer and a white medicinal oil that has a low viscosity, has no aromatic content, has a high flash point, has a low pour point, is food contact approved, is non-toxic, and is biodegradable, whereby this FPS composition is environmentally acceptable for use in onshore and offshore oil field servicing fluids and is awarded a classification in category group "D" by Center for Environment, Fisheres & Aquaculture Science (CEFAS) under the revised Offshore Chemical Notification Scheme (OCNS) for use in North-Sea.

DETAILED DESCRIPTION OF THE INVENTION

In accordance with this invention, it has been surprisingly found that by using white medicinal oil as a carrier, high solids content and environmental friendly anhydrous fluidized polymer suspensions of xanthan gum, cellulose ethers, guar gum and derivatives thereof can be prepared. Depending upon the type of the polymer used, stable and flowable fluidized polymer suspensions containing from 40% to 55% active content can be prepared. Synthetics such as polyacrylamide and polyacrylate may also be suspended in this slurry system.

| Ingredient | Type | Preferred/Trademark | Concentration, Wt. % |
|---|---|---|---|
| Solvent carrier | White medicinal oil | Ecolane 130 | 48.24 |
| Suspending agent | Organophilic clay | Tixogel MP100 | 3.38 |
| Stabilizer | Sorbitan trioleate ester | Montane 85 | 0.37 |
|  | Ethoxylated Sorbitan trioleate ester | Montanox 85 | 3.01 |
| Polymer | Cellulose ether, xanthan gum (XG), Guars, etc., optionally synthetics | CMC, HEC, Guar, XG, PAAM*, PAAC** | 45.00 |

*PAAM = polyacrylamide
**PAAC = polyacrylate

SOLVENT CARRIER

From regulatory point of view, the white medicinal oils have been approved for use as emolients/moisturizers and are widely used in pharmaceutical, cream denture adhesive and cosmetic formulations. They are listed in the International Nomenclature for Cosmetics Ingredients (I.N.C.I.) under designation "Paraffinum Liquidum". They comply with many pharmacopoeia and FDA regulations.

In accordance with this invention, any white mineral oil can be used as long as it is in compliance with food contact regulations (i.e., it is edible). Hence, it is essential that it is non-toxic; the white mineral oil must also be biodegradable 60% at least after 28 days in freshwater and seawater under the Organization for Economical Commercial Development (OECD) 301 and OECD306 protocols, respectively. Also, the white mineral oil should be in compliance with major Pharmacopoeia and F.D.A. regulations and the EPA requirements with regard to "oil and grease" test. It also should have a Classification in, at least, category "D" under revised OCNS regulations.

The white mineral oil should have a low kinetic viscosity at 40° C.; the lower the viscosity, the better is the mineral oil for use in the present invention. Kinetic viscosity measurement was used because of the low viscosity of the white mineral oil. The white mineral oil should have generally a kinetic viscosity (at 40° C.) lower limit of about 2 mm$^2$ sec$^{-1}$ (2 centistokes (cSt)); preferably 5 cSt, and more preferably 7.5 cSt. Generally, the upper limit Kinetic viscosity at 40° C. of the white mineral oil should be about 17 cSt, preferably 14 cSt, and more preferably 10 cSt. The white mineral oil also should have no aromatic content. It should be noted that any aromatic content of 100 ppm or less is considered to be free of aromatics. However, it is preferred that the aromatic content be less than 50 ppm, more preferably less than 30 with zero aromatic content being the most desired level.

The white mineral oil should have a high flash point and a low pour point because of the environment in which it is used. The flash point of the white mineral oil should generally be above 100° C., preferably above 110° C., and more preferably above 120° C. On the other hand, the pour point should be as low as possible, generally being lower than −5° C., preferably lower than −10° C., and more preferably lower than −15° C.

In accordance with this invention, the solvent carrier of the FPS composition has a lower limit amount of about 20 weight percent based on the total weight of the composition, preferably about 30 weight percent, and more preferably about 40 weight percent. The upper limit amount of the solvent carrier is about 60 weight percent, preferably about 55 weight percent, and more preferably about 50 weight percent.

The preferred commercially available white mineral oils are Carnation® oil from Witco, Marcol® 52 from Exxon, Ondina® 3 from Shell and Ecolane® 130 from TOTAL-FINA.

With regard to these requirements, the white medicinal oil "Ecolane® 130" is the most suitable. It is considered to be free of aromatics (any content below 100 ppm is considered as trace), biodegradable, non-toxic, and classified in category "D" under Revised OCNS. See detailed information below:

| Detailed characteristics of Ecolane 130 | |
|---|---|
| Flash point, ASTM D 93 | 135° C. |
| Aromatics content | Typically 30 ppm |
| Benzene content, ASTM D 4367 | 0 ppm |
| Kinetic viscosity @ 40° C., ASTM D 445 | 4.1 mm$^2$/sec |
| Pour point, ASTM D 95 | −20° C. |
| German Foodstuff B.G.V.V. | Pass |
| Liquid paraffin test | Pass |
| German pharmacopeia D.A.B.96 | Pass |
| USA, Food & Drugs 21CFR chl §178.3620 | Pass (approved for food contact) |
| USA, Environmental Protection Agency Oil-and-grease and total petroleum hydrocarbons test (EPA method 1664) | Pass Toxicity and Ecotoxicity |

| Summary of Ecolane 130 | | | | |
|---|---|---|---|---|
| Tox/Ecotox | Tests | Norm | Laboratory | Ecolane 130 |
| Ecotoxicity | Aerobic biodegradation | OECD306 Sea-water | SINTEF/Norway | Readily biodegradable 28 days 76.5% |
| Ecotoxicity | Aerobic biodegradation | OECD301F Fresh-water | HCSG/CEFIC | Readily biodegradable 28 days > 60% |
| Ecotoxicity | Fish Rainbow Trout | OECD GL203 | HCSG/CEFIC | >100 mg/l |
| Solubility | Solubility In water | Internal method | TOTAL-PFS | <1 mg/l |
| Toxicity | Acute dermal Imitation/corrosion | OECD GL 404 | CIT/France | Not irritating No classification |
| Toxicity | Acute eye Imitation/corrosion | OECD GL 405 | CIT/France | Not irritating No classification |
| Aquatic Toxicity | Algae Skeletonema Costatum | ISO/DIS 10253 | SINTEF/Norway | 48h EC50: >100000 mg/l 72h EC90: >100000 mg/l |
| Aquatic Toxicity | Crustacean Acartia tonsa | ISO TC 147/SC5/WG2 | SINTEF/Norway | 48h LC50: 22650 mg/l 48h LC100/LC90: 48398 mg/l |
| Aquatic Toxicity | Sediment reworker Corophium volutator | | SINTEF/Norway | 10d LC50: 1211 mg/l 10d LC100/LC90: 5250 mg/l |
| Bioaccumulation | | | | Not soluble in water Log Pow > 3 |

Based on this information, Ecolane 130 has been classified by CEFAS (Center for Environment, Fisheries & Aquaculture Science) in the category "D" under the revised Offshore Chemical Notification Scheme for use in the North Sea (UK sector) as lubricant in water-based drilling fluids at a concentration limit of 5% W.W. maximum.

SUSPENDING AGENTS

The most important commercial clays used in oil-based drilling fluids are organophilic clays. Organophilic clay is a modified montmorillonite designed for use in organic systems containing from low to high polarity solvents or solvent blends. It provides reproducible viscosity and thixotropy development, a high degree of sag control and prevents solid particles from settling. Any organophilic clay can be used as the suspending agent, but the preferred ones are self-dispersing and do not require a polar activator (e.g. water, methanol, ethanol, propylene carbonate, etc.).

In accordance with this invention, the suspending agent of the FPS composition has a lower limit amount of about 0.5 weight percent based on the total weight of the composition, preferably about 1.0 weight percent, and more preferably 2.0 weight percent. The upper limit amount of the suspending agent is 6.0 weight percent, preferably 4.0 weight percent, and more preferably 3.4 weight percent.

Examples of organophilic clays are Tixogel® product, available from United Catalyst Inc. (Louisville, Ky.), Bentone® product, available from Rheox company (Hightestown, N.J.) and Claytone® product, available from Southern Clay Products (Gonzalez, Tex.). The preferred organophilic clays are self-dispersing and do not require a polar activator such as Tixogel® MP100 product, Bentone® SDI product, and Claytone AF product. In accordance with this invention, the most preferred organophilic clay is Tixogel® MP100 product.

STABILIZERS

In oil-based drilling fluids, surfactants are used primarily as emulsifying and stabilizing agent. Solids present in oil base muds must be kept wet with oil to prevent settling and mud instability. The non-ionic surfactant(s) suitable for use in the FPS composition of this invention has a hydrophilic-lipophilic balance (HLB) of from about 1 to about 14, preferably from about 1.4 to about 11. The term "HLB" is well known in the prior art and is defined as the balance of the size and strength of the hydrophilic (water loving or polar) and the lipophilic (oil loving or non polar) groups of the emulsifier.

In accordance with this invention, the stabilizing agent of the FPS composition has a lower limit amount of about 0.5 weight percent based on the total weight of the composition, preferably about 2.0 weight percent, and more preferably 3.0 weight percent. The upper limit amount of the stabilizing agent is about 6.0 weight percent, preferably about 4.0 weight percent, and more preferably about 3.4 weight percent.

Examples of surfactants that are used in this invention are non-ionic, such as sorbitan esters, ethoxylated sorbitan esters (e.g., polyethoxyethylene sorbitan esters), ethoxylated fatty alcohols (e.g., oxo, lauyl, cetyl, straeryl, cetyl-stearyl and oleyl polyethoxyethylene fatty alcohols), and ethoxylated fatty acids (e.g., Oleic and Stearic polyethoxyethylene fatty acids). The preferred surfactants are sorbitan esters or ethoxylated sorbitan esters or mixtures thereof. The most preferred surfactant is a blend of sorbitan trioleate/ethoxylated sorbitan trioleate such as Montane® 85/Montanox® 85 products, available from SEPPIC (Paris, France) and Sorban® AO/Sorbanox® AO products, available from Witco (Saint Pierre-les-Elboeuf, France).

Nonionic surfactants are blended in such a way to achieve an average HLB value of about 10 for optimum slurry stability.

In accordance with the present invention, the fluidized polymer suspensions do not contain any nonylphenol ethoxylate surfactants (NPES). These surfactants are strictly prohibited from use in the North Sea sector.

HYDROPHILIC POLYMERS

In accordance with this invention, the hydrophilic polymer of the FPS composition can have a solids content substantially higher than in the prior art fluid polymer systems because of the unique properties of the solvent carrier. The polymer can be loaded in the composition having a lower limit amount of about 10 weight percent based on the total weight of the composition, preferably about 40 weight percent, and more preferably 45 weight percent. The upper limit amount of the hydrophilic polymers is 80 weight percent, preferably 55 weight percent, and more preferably 50 weight percent.

In accordance with this invention, most polysaccharides used in oil field servicing fluids are already classified in the category "E" corresponding to fully biodegradable ingredients. Polysaccharides such as cellulose ethers, biopolymers, starch, and guar gum and its derivatives are used in a wide variety of oil field applications. The cellulose ethers include carboxymethylcellulose (CMC), hydroxyethylcellulose (HEC), carboxymethylhydroxyethylcellulose (CMHEC), polyanionic cellulose (PAC) and guar gum and guar gum derivatives including straight guar (Guar), carboxymethylguar (CMG), hydroxypropylguar (HPG), carboxymethylhydroxypropylguar (CMHPG) and cationic guar (Cat. Guar) and starch including carboxymethylstarch, hydroxyethylstarch, and hydroxypropylstarch.

Biopolymers include xanthan gum (XG), scleroglucone, welan, gelan. Additionally, to these polysaccharides, synthetics such as polyacrylamide (PAAM) and polyacrylates (PMC) may be suspended in this invention.

Guar and its derivatives are the most extensively used polymers in fracturing fluids. They are specially designed for hydraulic fracturing. Guar is used to thicken the fracturing fluid so that it can carry graded sand (proppant) into the fractured formation. Next to fracturing fluids, guar and its derivatives can also be used as viscosifiers and fluid loss additives in low solids drilling muds. Due to their non-ionic nature and high mean average molecular weight (Mw), guar has the ability to develop viscosity in water or brines.

The non-ionic nature of hydroxyehtylcellulose (HEC) allows the polymer to be used in a wide range of workover and completion fluids. These completion fluids are non-damaging and often clear fluids that are exposed to producing formations. They range from monovalent NaCl solutions to mixed divalent $ZnBr_2/CaBr_2$ brines. For these applications, ultra high mean average molecular weight (Mw) HEC is the most extensively used polymer as a cost-effective viscosifier. Next to workover and completion fluids, high Mw HEC can also be used in gravel packing for maximum clean up, spud muds for immediate viscosity buildup and in low solids and brine based drilling fluids. Under certain circumstances, xanthan gum may be used to improve the low-end rheology necessary to keep cuttings in suspension when the fluid circulation is stopped.

Although high Mw HECs can be used as anti-settling agents, in combination with synthetic polymers under high temperature conditions, low Mw HECs are most preferred as fluid loss control additives for oil well cements. They enable a good balance between fluid loss control and rheological properties by allowing higher flexibility of the polymer dosage under different operating conditions. Such low Mw HECs may also find some use in-drill-in-fluids.

Because of their mixed substitution, CMHECs provide thickening, fluid loss control and stabilization functions of many oil well fluids, including drilling, stimulation, gravel packing and cementing. The anionic carboxymethyl substitution gives these polymers the useful properties of a highly hydrophilic polymer such as CMC, while the non-ionic hydroxyethyl substitution confers improved tolerance to salts.

Although Natrosol® products, (HECs marketed by Hercules Incorporated) are classified under the category "E", their fluidized suspension form called "Liquid Natrosol" has been awarded the category "D" because of the solvent carrier (the most preferred categories is "E" followed by "D"). Therefore, "Liquid Natrosol" is considered as environmentally acceptable for use in the North Sea sector. This classification is required prior to any attempt to use the product in the field.

Also, due to recent changes of discharge specifications for completion fluids and related additives set by EPA (Environment Protection Agency) in the USA, tests by the market place show that all mineral oils currently used by liquid HEC manufacturers will not pass the required "oil-and-grease and total petroleum hydrocarbons" test. To be discharged, the fluids must contain, on a daily basis, less than 42 mg/l oil-and-grease content as measured by test method 1664 (a 30 days average of less than 29 mg/l). This test relates to "N-Hexane Extractable Material (HEM) and Silica Gel Treated N-Hexane Extractable Material (SGT-HEM) by Extraction and Gravimetry."

In response to the above requirements concerning the EPA Method 1664 regarding Ecolane® 130 product, TOTALFINA, the manufacturer on this product confirmed that Ecolane® 130 product is entirely extractable by "N-Hexane". TOTALFINA further guarantees that the Ecolane® 130 product is a blend of alkanes and as such is not adsorbed by silica gels. As a result, SGT-HEM is below the detection limit of 5 mg/l, which largely meets the EPA specifications.

Based on this information, fluidized polymer suspensions in accordance with this invention can be considered as environmental friendly slurry that can be used in oil well activities such as drilling, completion, stimulation and cementing.

The following examples will serve to provide specific illustrations of the practice of this invention but they are not intended in any way to be limiting the scope of this invention.

EXAMPLES 1–12—DRILLING FLUIDS

Examples 1 to 12 describe preparation of a fluidized polymer suspension of CMC, xanthan gum, polyacrylamide, polyacrylate, and combinations thereof. The polymer slurries contain from 45% to 50% active water-soluble polymer (WSP), from 3.07% to 3.41% Tixogel® MP100 product, and from 3.07% to 3.41% Montane® 85/Montanox® 85 surfactant blends suspended in different types of mineral oils. With the exception of the "Isopar® V" product from Exxon chemicals and HDF®2000 product from TotalFina, all other mineral oils used are classified as cosmetic grade oils. The compositions of the fluidized polymer suspensions of Examples 1–12 are summarized in Table 1-a.

The suspensions properties were characterized by Brookfield viscosity, fluidity and physical stability over a period of 3 months. Data are in Table 1-b.

The fluidity was evaluated with AFNOR cup No 6, by measuring the time required for 96 ml (or 50 ml when indicated) of free flowing suspension. The shorter is the time, the better is the fluidity.

To simulate about a one year stability at room temperature, the suspensions were aged for 3 months at 40° C., and the stability was characterized by the extent of phase separation. After 3 months of aging (both at room temperature and 40° C.) the suspension stability was characterized by weighing out the amount of clear syneresis on top of the suspension sample. The data are presented as "Syneresis Layer (Wt. %)" in Table 1-b.

The data indicated that with the exception of the Marcol® 52 and Canation® oil carriers, the overall viscosity of the polymer suspensions were reasonably low with good fluidity. Also, despite their high solids content and low viscosity, the stability of the suspensions was excellent with almost no sag or particles settled at the bottom of the container after the aging period.

Application examples in the Table 1-c illustrate the functionality of the fluidized polymer suspension of Example 5 used in synthetic sea water (42 g/l sea salt) based drilling fluid systems, developed by American Petroleum Institute (API) for hivis PAC testing, for determining the viscosity and filtration control properties. The viscosity and fluid loss data were measured after 2 hours static aging at room temperature. The data indicated that this type of polymer suspensions are suitable for use as viscosifiers and fluid loss reducing agents in most water based drilling fluids where PAC or CMC are commonly used. Also, fluidized polymer suspensions have the advantage to be easily dissolved without dusting or lumping problems that occurs with dry powders.

TABLE I-a

Fluidized Polymer Suspensions of WSPs for drilling fluids

| Ingredients | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|
| Ondina 3 | 43.86% | — | — | — | — | — | — | — | — | — | — | — |
| Isopar V | — | 43.86% | — | — | — | — | — | — | — | — | — | — |
| HDF 2000 | — | — | 43.86% | — | — | — | — | — | — | — | — | — |
| Marcol 52 | — | — | — | — | — | — | 43.86% | — | — | — | — | — |
| Carnation oil | — | — | — | 48.24 | — | — | — | — | — | 48.24% | 48.24% | 48.24% |
| Ecolane 130 | — | — | — | — | 48.10% | 43.86% | — | 48.10% | 43.86% | — | — | — |
| Tixogel MP100 | 3.07% | 3.07% | 3.07% | 3.38% | 3.41% | 3.07% | 3.07% | 3.41% | 3.07% | 3.38% | 3.38% | 3.38% |
| Montane 85 | 0.33% | 0.33% | 0.33% | 0.37% | 0.37% | 0.33% | 0.33% | 0.37% | 0.33% | 0.37% | 0.37% | 0.37% |
| Montanox 85 | 2.74% | 2.74% | 2.74% | 3.01% | 3.04% | 2.74% | 2.74% | 3.04% | 2.74% | 3.01% | 3.01% | 3.01% |
| Blanose CMC 9H4X, lot 20112 | 50.00% | 50.00% | 50.00% | — | — | — | — | — | — | — | — | — |
| Blanose CMC 7H3SXF, lot 71179 | — | — | — | 45.00% | — | — | — | — | — | — | — | — |
| Blanose CMC 7H4X, lot 61319 | — | — | — | — | 45.09% | 50.00% | 20.00% | 22.55% | 25.00% | — | 27% | — |
| Xanthan Gum, Rhodopol 23 | — | — | — | — | — | — | 30.00% | 22.55% | 25.00% | — | — | — |
| Polyacrylamide, JFPAM20 | — | — | — | — | — | — | — | — | — | 45.00% | 8% | — |
| Polyacrylate, Norsolor SH10 | — | — | — | — | — | — | — | — | — | — | — | 45.00% |

TABLE 1-b

Stability data

| | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|
| Flow properties, AFNOR cup N° 6, Seconds | | | | | | | | | | | | |
| 0 | 28 | 31 | 20 | 35* | 30 | 52 | 268 | 19 | 31 | 34* | 18 | 163* |
| 1 week | 28 | 26 | 20 | 27* | 23 | 41 | 300 | 19 | 28 | 36* | 16 | 50* |
| 4 weeks | 30 | 26 | 20 | 29* | 21 | 39 | 290 | 19 | 30 | 31* | 15 | 69* |
| 12 weeks | 27 | 25 | 20 | 29* | 22 | 37 | 298 | 19 | 31 | 29* | 14 | 67* |
| LVF Brookfield viscosity, mPa.s Spindle 3 or 4, 30 rpm | | | | | | | | | | | | |
| 0 | 1440 | 1100 | 940 | 4500 | 1300 | 1920 | 5500 | 940 | 1400 | 2680 | 740 | 4100 |
| 1 week | 1300 | 940 | 900 | 4300 | 1060 | 1500 | 4900 | 850 | 1200 | 3020 | 650 | 3200 |
| 4 weeks | 1360 | 980 | 920 | 4400 | 960 | 1280 | 4200 | 710 | 1080 | 2880 | 630 | 3500 |
| 12 weeks | 1480 | 1060 | 940 | 4700 | 1100 | 1540 | 4700 | 770 | 1200 | 2560 | 615 | 3600 |
| Syneresis Layer (Wt. %) | | | | | | | | | | | | |

TABLE 1-b-continued

Stability data

|  | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|
| 12 weeks, room temperature | 5.4 | 3.6 | 7.7 | 0.83 | 4.26 | 4.13 | 2.5 | 5.83 | 4.67 | 0.69 | 4.61 | 1.49 |
| 12 weeks, 40° C. | 9 | 8.1 | 12.4 | 2.64 | 7.23 | 7.7 | 5 | 8.24 | 8.6 | 2.84 | 9.59 | 7.05 |

*Flow of 50 ml

| Ingredients | Composition | |
|---|---|---|
| Sea salt* solution | 358 g | 358 g |
| KCl | 35 g | 35 g |
| Sodium Bicarbonate | 1 g | — |
| OCMA clay | 28 g | |
| Example 5 | 2.22 g | 6.67 g |
| Apparent viscosity | — | 62 cPs |
| 30' API Fluid loss | 11.4 ml | — |
| Corrected Fluid loss | 14 ml | — |

*Sea salt, ASTM D1141-52 (or latest revision), Formula A

EXAMPLES 13–16—COMPLETION FLUIDS

Examples 13 to 16 describe preparation of a fluidized polymer suspension of glyoxal treated (Natrosol® 250HHR-P) and non-glyoxal treated (Natrosol® 250HHW) high viscosity HECs. Both HEC types, available from Hercules Incorporated, Wilmington, Del.) are used as viscosifiers and fluid loss reducers of completion fluids. In these Examples, the HEC active content was varied from 40% to 50%. The compositions of the fluidized polymer suspensions of Examples 13–16 are summarized in Table 2-a. The stability of the suspensions were characterized following the same protocol described previously. Data are reported in Table 2-b.

Application examples in the Table 2-c illustrate the functionality of the fluidized polymer suspension of Example 14, containing Natrosol® 250HHR-P product, used to viscosify 13 ppg (pound per gallon) density $CaCl_2/CaBr_2$ brine fluid. The fluidized polymer suspension was used at a dosage of 2 gal/bbl (gallon per barrel) and mixed for 1 hour prior to rheology measurements. Also, two preparation procedures were used for this test. The preparation No. 1 consisted of adding the HEC suspension into the combined $CaCl_2/CaBr_2$ brine and mixing on a Hamitlon Beach mixer for 1 hour. The preparation No 2 consisted to adding the HEC suspension into the $CaCl_2$ brine (11.3 ppg) first and mixing for 30 minutes, then followed by the addition of the $CaBr_2$ brine (14.2 ppg) and mixing for further 30 minutes (1 hour total mixing time). The data indicated that whatever the dissolving procedure followed, the suspension of Example 14 gave high rheology properties. However, the dissolving procedure following the preparation No. 2 provides higher viscosity development profile. The data demonstrated the viscosity building efficiency of Example 14 in medium-high density brine based completion fluids.

| Ingredients | Example 13 | Example 14 | Example 15 | Example 16 |
|---|---|---|---|---|
| Ecolane 130 | 54.55% | 48.24% | 48.00% | 43.86% |
| Tixogel MP100 | 2.73% | 3.38% | 3.40% | 3.07% |
| Montane 85 | 0.30% | 0.37% | 0.37% | 0.33% |
| Montanox 85 | 2.43% | 3.01% | 3.03% | 2.74% |
| Natrosol 250HHR-P, lot S-0609 | 40.00% | 45.00% | — | — |
| Natrosol 250HHW, lot T-0646 | — | — | 45.00% | 50.00% |

|  | Example 13 | Example 14 | Example 15 | Example 16 |
|---|---|---|---|---|
| Flow properties, AFNOR cup No. 6, Seconds | | | | |
| 0 | 23 | 94 | 47 | 161 |
| 1 week | 15 | 41 | 43 | 219 |
| 4 weeks | 14 | 56 | 52 | 277 |
| 12 weeks | 15 | 49 | 48 | 146 |
| LVF Brookfield viscosity, mPa.s Spindle 3 or 4, 30 rpm | | | | |
| 0 | 755 | 2000 | 1540 | 2900 |
| 1 week | 510 | 1440 | 1360 | 2760 |
| 4 weeks | 480 | 1560 | 1400 | 2800 |
| 12 weeks | 590 | 1560 | 1460 | 2850 |
| Syneresis Layer (Wt. %) | | | | |
| 12 weeks, room temperature | 7.1 | 1.88 | 3.9 | 1.46 |
| 12 weeks, 40° C. | — | — | 11.35 | 8.11 |

| Ingredients | Composition |
|---|---|
| CaCl2 | 273 g |
| CaBr2 | 273 g |
| Example 14 | 2 gal/bbl. |
| pH | 7.7 |
| Density | 13 ppg |

| | Fann35 Dial reading | |
|---|---|---|
| Fann Rheology | Preparation No. 1 | Preparation No. 2 |
| 600 rpm | >300 | >300 |
| 300 rpm | 254 | >300 |
| 200 rpm | 222 | 280 |
| 100 rpm | 182 | 232.5 |
| 6 rpm | 80 | 108.5 |
| 3 rpm | 59.5 | 85.5 |

EXAMPLES 17–20—OIL WELL CEMENT SLURRIES

Examples 17 to 20 describe preparation of a fluidized polymer suspension of low Mw HECs (Natrosol® 180GXR, 250EXR and 250GXR) suitable as fluid loss additive for cement slurries. The slurries were prepared at 45% active content. The suspension of Example 18 was prepared by incorporating sodium thiosulfate (at ratio 1:3 based on HEC) into the slurry to extend the thermal stability, and consequently the operating temperature, of the suspended Natrosol® 180GXR HEC. The compositions of the fluidized polymer suspensions of Examples 17–20 are summarized in Table 3-a and their corresponding suspension properties in Table 3-b.

Application examples in the Table 3-c illustrate the functionality of the fluidized polymer suspension of Example 19, containing Natrosol® 250EXR HEC, used as a low to medium temperature fluid loss additive for a typical cement slurry. The fluidized polymer suspension of Example 19 was used at a dosage of 0.58%, dry basis, based on weight of cement (BWOC) in a slurry system containing cement "H", 0.5% BWOC Lomar® D dispersant, available from Geo Specialty Chemicals Inc, Cedatown, Ga.) and 37% BWOC demi-water. The fluid loss was measured after conditioning for 20 minutes at 80° F. and 160° F. For comparative purposes, dry Natrosol® 250EXR was tested at 160° F. The data indicated clearly that when used in a liquid form, Natrosol® 250EXR HEC gives exceptionally low fluid loss data. This is due to the fact that the HEC is fully dissolved prior to its addition to the dry cement mixture. During the mixing process, there was a little competition for the available water required for both dissolving the polymer and hydrating the cement and other dry ingredients. The data demonstrated that Example 19 does control the fluid loss of cement slurries more efficiently than dry HECs.

| Ingredients | Example 17 | Example 18 | Example 19 | Example 20 |
|---|---|---|---|---|
| Ecolane 130 | 48.24% | 48.24% | 48.24% | 48.24% |
| Tixogel MP100 | 3.38% | 3.38% | 3.38% | 3.38% |
| Montane 85 | 0.37% | 0.37% | 0.37% | 0.37% |
| Montanox 85 | 3.01% | 3.01% | 3.01% | 3.01% |
| 180GXR, lot 0828-53-06 | 45.00% | 42.00% | — | — |
| Na2S2O3 | — | 13.00% | — | — |
| HEC 250EXR, lot T-0071 | — | — | 45.00% | — |
| HEC 250GXR, lot 38631 | — | — | — | 45.00% |

| | Example 17 | Example 18 | Example 19 | Example 20 |
|---|---|---|---|---|
| Flow properties, AFNOR cup No. 6, Seconds | | | | |
| After preparation | 82 | 82* | 48 | — |
| LVF Brookfield viscosity, mPa.s Spindle 3 or 4, 30 rpm | | | | |
| After preparation | 2140 | 3400 | 1000 | 2180 |

*Flow of 50 ml

| Ingredients | Composition | |
|---|---|---|
| Cement "H" | 600 g | 600 g |
| Lomar D | 0.50% BWOC | 0.50% BWOC |
| Example 19 | — | 1.29% BWOC |
| 250EXR | 0.58% BWOC | — |
| Demineralized Water | 37% BWOC | 37% BWOC |
| 30' API Fluid loss @ 80° F. | — | 15.6 ml |
| 30' API Fluid loss @ 160° F. | 44 ml | 25.6 ml |

EXAMPLES 21—FRACTURING FLUIDS

Example 21 describes preparation of a fluidized polymer suspension containing 46% active, high viscosity, straight guar. This type of guar is used as a standard viscosity-enhancing agent of fracturing fluids. Example 21 was especially designed to meet some basic requirements with regard to the viscosity of the guar suspension for use in fracturing fluids. The viscosity should be low enough to enable "Fann" viscometer dial readings below 250 at 300 rpm and sufficiently high enough to guaranty a good slurry stability (<5% syneresis) after 24 hours aging. Example 21 meets both requirement. The compositions of the fluidized polymer suspension of Example 21 are summarized in Table 4-a. The stability of the suspensions was characterized following the same protocol described previously. Data are reported in Table 4-b.

Figure 1:
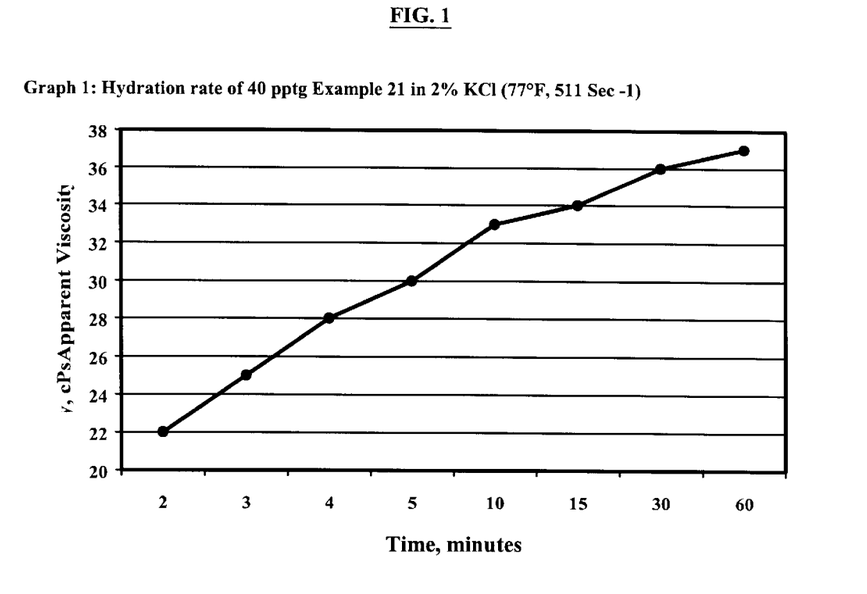
FIG. 1 is a graph that illustrates the hydration rate of 40 pound per 1000 gallons (pptg) in 2% KCl salt solution for Example 21.

The hydration rate/linear gel development of the fluidized polymer suspension of Example 21 was determined at a dosage of 40 pptg (pound per thousand gallons), dry basis, in 2% KCl salt solution. The viscosity development profile was recorded at 511 $sec^{-1}$ shear rate and 77° F. using Fann 35 viscometer, over a period of 60 minutes. The graph 1 (FIG. 1) illustrates the quick dissolving of the fluidized polymer suspension of Example 21 demonstrating that 90% of the final viscosity is reached after 10 minutes time period.

Figure 2:
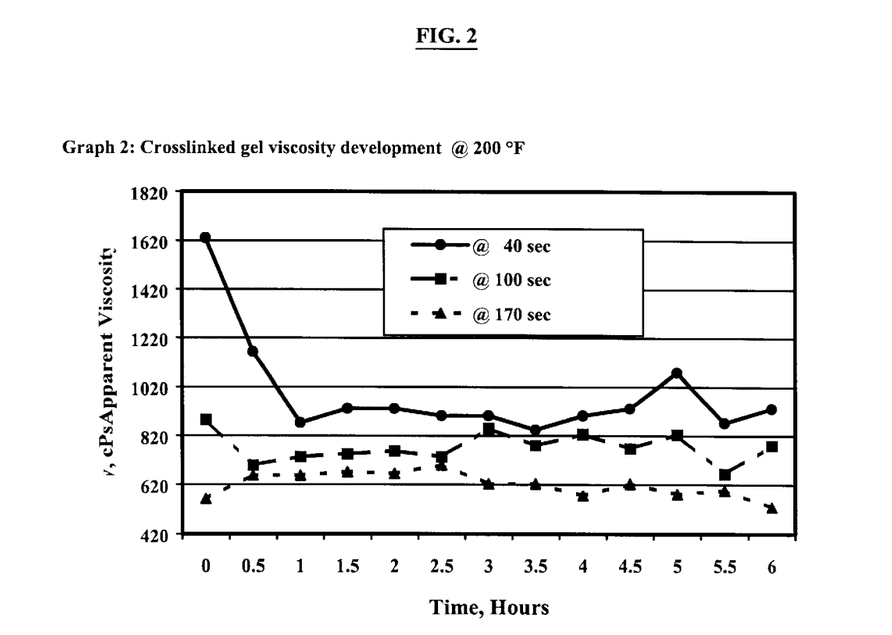
FIG. 2 is a graph that illustrates for Example 21 the crosslinked gel viscosity develoment at 200° F.

The application example in the table 4-c illustrates the crosslinked gel viscosity development of a typical fracturing fluid containing 40 pptg, on dry basis, of the fluidized polymer suspension of Example 21, 10 pptg $Na_2S_2O_3$, 10 pptg $Na_2CO_3$ and 2 gptg (gallon per thousand gallons) borate crosslinker in 1 gptg tetra methyl ammonium chloride (TMAC) solution. The test was run on Fann 50 viscometer at three different shear rates (40 $sec^{-1}$, 100 $sec^{-1}$ and 170 $sec^{-1}$) and 200° F. over a period of 6 hours. The graph 2 (FIG. 2) shows that the crosslinked gel viscosity remains stable at all the tested shear rates over the testing time period without any break of the gel structure.

| Ingredients | Example 21 |
|---|---|
| Ecolane 130 | 50.00% |
| Tixogel MP100 | 2.00% |
| Montane 85 | 0.22% |
| Montanox 85 | 1.78% |
| Hivis Guar, X32140-4-1 | 46.00% |

|  | Example 21 |
|---|---|
| Flow properties, AFNOR cup No. 6, Seconds | |
| 0 | 23 |
| 1 week | 19 |
| 4 weeks | 19 |
| LVF Brookfield viscosity, mPa.s | |
| Spindle 3 or 4, 30 rpm | |
| 0 | 690 |
| 1 week | 610 |
| 4 weeks | 600 |
| 12 weeks | — |
| Fann Viscosity, cPs | |
| 300 rpm DR | 209 |

| | Crosslinked Gel Viscosity | | | | | Correlation |
|---|---|---|---|---|---|---|
| TIME (hours) | @ 40 sec$^{-1}$ (cPs) | @ 100 sec$^{-1}$ (cPs) | @ 170 sec$^{-1}$ (cPs) | n' | K (lb-sec/ sq. ft.) | Co-efficient R |
| 0.0 | 1630 | 885 | 561 | 0.271 | 0.506 | 0.9836 |
| 0.5 | 1164 | 698 | 657 | 0.587 | 0.107 | 0.9810 |
| 1.0 | 873 | 733 | 657 | 0.805 | 0.037 | 1.0000 |
| 1.5 | 931 | 745 | 671 | 0.772 | 0.045 | 0.9999 |
| 2.0 | 931 | 757 | 664 | 0.767 | 0.046 | 1.0000 |
| 2.5 | 902 | 733 | 698 | 0.818 | 0.036 | 0.9991 |
| 3.0 | 902 | 850 | 623 | 0.765 | 0.047 | 0.9846 |
| 3.5 | 844 | 780 | 623 | 0.804 | 0.037 | 0.9940 |
| 4.0 | 902 | 826 | 575 | 0.713 | 0.057 | 0.9554 |
| 4.5 | 931 | 768 | 623 | 0.730 | 0.053 | 0.9956 |
| 5.0 | 1077 | 826 | 582 | 0.590 | 0.105 | 0.9734 |
| 5.5 | 873 | 663 | 596 | 0.732 | 0.048 | 0.9988 |
| 6.0 | 931 | 780 | 527 | 0.629 | 0.080 | 0.9511 |

What is claimed is:

1. An oil-based fluid polymer suspension (FPS) composition for use in oil or gas well servicing fluids comprising
   a) a hydrophilic polymer,
   b) an organophilic clay,
   c) a stabilizer that is a non-ionic surfactant selected from the group consisting of sorbitan esters, ethoxylated sorbitan esters, ethoxylated fatty alcohols, ethoxylated fatty acids, and mixtures thereof, and
   d) a white medicinal oil that is non-toxic and biodegradable 60% at least after 28 days in freshwater and seawater under OECD 301 and OECD 306 protocol,
whereby this FPS composition is environmentally acceptable for use in onshore and offshore oil field servicing fluids.

2. The oil-based FPS composition of claim 1, wherein lower limit amount of the white medicinal oil is about 20 wt % based on the total weight of the composition.

3. The oil-based FPS composition of claim 1, wherein lower limit amount of the white medicinal oil is about 30 wt % based on the total weight of the composition.

4. The oil-based FPS composition of claim 1, wherein lower limit amount of the white medicinal oil is about 40 wt % based on the total weight of the composition.

5. The oil-based FPS composition of claim 1, wherein upper limit amount of the white medicinal oil is about 60 wt % based on the total weight of the composition.

6. The oil-based FPS composition of claim 1, wherein upper limit amount of the white medicinal oil is about 55 wt % based on the total weight of the composition.

7. The oil-based FPS composition of claim 1, wherein upper limit amount of the white medicinal oil is about 50 wt % based on the total weight of the composition.

8. The oil-based FPS composition of claim 1, wherein the white medicinal oil has a Kinetic viscosity at 40° C. lower limit of 2 mm$^2$ sec$^{-1}$ (2 cSt.).

9. The oil-based FPS composition of claim 1, wherein the white medicinal oil has a Kinetic viscosity at 40° C. lower limit of 5 cSt.

10. The oil-based FPS composition of claim 1, wherein the white medicinal oil has a Kinetic viscosity at 40° C. lower limit of 7.5 cSt.

11. The oil-based FPS composition of claim 1, wherein the white medicinal oil has a Kinetic viscosity at 40° C. upper limit of 17 cSt.

12. The oil-based FPS composition of claim 1, wherein the white medicinal oil has a Kinetic viscosity at 40° C. upper limit of 14 cSt.

13. The oil-based FPS composition of claim 1, wherein the white medicinal oil has a Kinetic viscosity at 40° C. upper limit of 10 cSt.

14. The oil-based FPS composition of claim 1, wherein the white medicinal oil has an aromatic content upper limit equal to or less than 100 ppm.

15. The oil-based FPS composition of claim 1, wherein the white medicinal oil has an aromatic content of less than 50 ppm.

16. The oil-based FPS composition of claim 1, wherein the white medicinal oil has an aromatic content of less than 30 ppm.

17. The oil-based FPS composition of claim 1, wherein the white medicinal oil has a flash point above 100° C.

18. The oil-based FPS composition of claim 1, wherein the white medicinal oil has a pour point lower than −5° C.

19. The oil-based FPS composition of claim 1, wherein the organophilic clay suspending agent is a modified montmorillonite.

20. The oil-based FPS composition of claim 19, wherein the organophilic clay suspending agent is treated in such a way that its dispersion and gellation is self activated.

21. The oil-based FPS composition of claim 19, wherein the dispersion and gellation of the organophilic clay suspending agent is aided by polar sovents.

22. The oil-based FPS composition of claim 21 wherein the polar solvent is selected from the group consisting of water, methanol, ethanol, and propylene carbonate.

23. The oil-based FPS composition of claim 19, wherein the organophilic clay suspending agent has a lower limit of about 0.5 wt % based on the total weight of the composition.

24. The oil-based FPS composition of claim 19, wherein the organophilic clay suspending agent has a lower limit of about 1.0 wt % based on the total weight of the composition.

25. The oil-based FPS composition of claim 19, wherein the organophilic clay suspending agent has a lower limit of about 2.0 wt % based on the total weight of the composition.

26. The oil-based FPS composition of claim 19, wherein the organophilic clay suspending agent has an upper limit of about 6.0 wt % based on the total weight of the composition.

27. The oil-based FPS composition of claim 19, wherein the organophilic clay suspending agent has an upper limit of about 4.0 wt % based on the total weight of the composition.

28. The oil-based FPS composition of claim 19, wherein the organophilic clay suspending agent has an upper limit of about 3.4 wt % based on the total weight of the composition.

29. The oil-based FPS composition of claim 1, wherein the non-ionic surfactant has a lower limit of about 0.5 wt % based on the total weight of the composition.

30. The oil-based FPS composition of claim 1, wherein the non-ionic surfactant has a lower limit of about 2.0 wt % based on total weight of the composition.

31. The oil-based FPS composition of claim 1, wherein the non-ionic surfactant has a lower limit of about 3.0 wt % based on the weight of the total weight of the composition.

32. The oil-based FPS composition of claim 1, wherein the non-ionic surfactant has an upper limit of about 6.0 wt % based on the total weight of the composition.

33. The oil-based FPS composition of claim 1, wherein the non-ionic surfactant has an upper limit of about 4.0 wt % based on the total weight of the composition.

34. The oil-based FPS composition of claim 1, wherein the wherein the non-ionic surfactant has an upper limit of about 3.4 wt % based on the total weight of the composition.

35. The oil-based FPS composition of claim 1, wherein the non-ionic surfactant is selected from the group consisting of polyethoxyethylene sorbitan esters.

36. The oil-based FPS composition of claim 1, wherein the non-ionic surfactant is selected from the group consisting of sorbitan esters, ethoxylated sorbitan esters and mixtures thereof.

37. The oil-based FPS composition of claim 36, wherein the non-ionic surfactant is a blend of sorbitan trioleate and ethoxylated sorbitan trioleate.

38. The oil-based FPS composition of claim 1, wherein lower limit amount of the hydrophilic polymer is about 10 wt % based on the total weight of the composition.

39. The oil-based FPS composition of claim 1, wherein lower limit amount of the hydrophilic polymer is about 40 wt % based on the total weight of the composition.

40. The oil-based FPS composition of claim 1, wherein lower limit amount of the hydrophilic polymer is about 45 wt % based on the total weight of the composition.

41. The oil-based FPS composition of claim 1, wherein upper limit amount of the hydrophilic polymer is about 80 wt % based on the total weight of the composition.

42. The oil-based FPS composition of claim 1, wherein upper limit amount of the hydrophilic polymer is about 55 wt % based on the total weight of the composition.

43. The oil-based FPS composition of claim 1, wherein upper limit amount of the hydrophilic polymer is about 50 wt % based on the total weight of the composition.

44. The oil-based FPS composition of claim 1, wherein the hydrophilic polymer is selected from the group consisting of polysaccharides that are claissified by CEFAS in category D or E under the revised Offshore Chemical Notification Scheme.

45. The oil-based FPS composition of claim 1, wherein the hydrophilic polymer is a synthetic ploymer.

46. The oil-based FPS composition of claim 1, wherein the hydrophilic polymer is a combination of a polysaccharide and a synthetics polymer.

47. The oil-based FPS composition of claim 44, wherein the polysaccharide is selected from the group consisting of cellulose ethers, biopolymers, starch and starch derivatives, guar gum and derivatives and mixtures thereof.

48. The oil-based FPS composition of claim 47, wherein the cellulose ether is selected from the group consisting of carboxymethylcellulose (CMC), hydroxyethylcellulose (HEC), carboxymethylhydroxyethylcellulose (CMHEC), polyanionic cellulose (PAC) and mixtures thereof.

49. The oil-based FPS composition of claim 47, wherein the guar gum derivative is selected from the group consisting of carboxymethylguar (CMG), hydroxypropylguar (HPG), carboxymethylhydroxypropylguar (CMHPG), cationic guar (Cat. Guar) and mixtures thereof.

50. The oil-based FPS composition of claim 47, wherein the starch derivative is selected from the group consisting of carboxymethylstarch, hydroxyethylstarch, hydroxypropylstarch, and mixtures thereof.

51. The oil-based FPS composition of claim 47, wherein the biopolymer is selected from the group consisting of xanthan gum, scleroglucone, welan, gelan, and mixtures thereof.

52. The oil-based FPS composition of claim 45, wherein the synthetic polymer is selected from the group consisting of polyacrylamide and polyacrylate.

53. The oil-based FPS composition of claim 1, wherein the gas or oil well servicing fluids are selected from the group consisting of drilling fluids, completion fluids, stimulation fluids and cementing fluids.

54. The oil-based FPS composition of claim 53, wherein the gas or oil well servicing fluids are used as rheology modifier agents, fluid loss additives, dispersant, lubricity enhancer, and shale inhibitor.

\* \* \* \* \*